UNITED STATES PATENT OFFICE.

CHARLES H. BELLAMY, OF PHILADELPHIA, PENNSYLVANIA, ASSIGNOR TO MONE R. ISAACS, OF SAME PLACE.

MANUFACTURE OF CASEIN AND CASEIN GLUE.

SPECIFICATION forming part of Letters Patent No. 681,436, dated August 27, 1901.

Application filed March 15, 1901. Serial No. 51,412. (No specimens.)

*To all whom it may concern:*

Be it known that I, CHARLES H. BELLAMY, of the city and county of Philadelphia, State of Pennsylvania, have invented an Improvement in the Manufacture of Casein and Casein Glue, of which the following is a specification.

My invention relates to the manufacture of casein and casein glue; and it consists of the improvements which are fully set forth in the following specification.

As casein sizing is at present manufactured there is great want of uniformity, which is largely due to the unskilful and unsatisfactory preparation of the casein from milk. It is the practice in the various dairies from which the supply comes to produce the casein by the addition to the skimmed milk of acetic acid (usually in the form of vinegar) or of sulfuric acid, or sometimes of hydrochloric acid. Owing to want of care or a desire to hurry coagulation, the acid is added in variable quantities, which produces variable results. Casein so produced is usually neutralized before it is converted into sizing. For this purpose it may be passed through a weak solution of milk of lime (calcic hydrate, $CaOH_2O$) until no reaction is shown with blue litmus-paper. The insoluble calcic acetate or calcic sulfate is washed out before the casein is converted into glue. I have found that much better results may be obtained by preparing the casein with the vegetable coagulants whose astringent properties are derived from tannic acid or which contain tannic acid as one of the constituent elements, such, *e. g.*, as catechu, kino, oak-bark and other barks, nutgalls, sumac, or dogwood. I have used with much success the bark of wild cherry (*Prunus virginiana*) for this purpose, which I have found in practice has no undesirable qualities such as are possessed by the mineral acids, and the casein so produced does not require any neutralization to render it suitable for the preparation of sizing. Another advantage possessed by this process of preparing the casein is that the results are uniform and no special care need be exercised as to the amount of the coagulant employed, since any excess of coagulant will remain in the solution and leave the casein when the whey is drawn off. To the casein, whether prepared in this manner by the use of the vegetable coagulants or by the old method with the use of acids and subsequently neutralized, I add a solution of an alkali arsenate—*e. g.*, potassium arsenate, ($K_2HAsO_4$.) In practice I have found that good results may be obtained by adding two pints of a solution of potassium arsenate (twenty to twenty-five per cent. solution) to one hundred (100) pounds, dry weight, of casein; but the proportion of the arsenate employed will vary with the age of the curd, the temperature, method of coagulation, &c., and therefore I do not mean to limit myself to the proportions. Instead of potassium arsenate any other alkali arsenate may be used—such, *e. g.*, as sodium arsenate, ($Na_2HAsO_4$,) ammonium arsenate, $(NH_4)_2HAsO_4$, calcium arsenate, ($CaHAsO_4$,) or magnesium arsenate, ($2MgHAsO_4$.) The arsenate not only increases the gelatinous properties of the casein glue thus produced and acts as a preservative, but forms a chemical mordant, and when the glue is used for coating paper it reacts on the vegetable proteins contained in the paper and the animal protein in the glue and the mineral base in the dye and forms a chemical combination which produces a superior finish and fixes colors.

I do not mean to limit myself to the addition of the arsenate in solution to produce the casein glue, as it is evident that the arsenate may be added to the casein in a dry state, leaving the final conversion into glue to be effected by the addition of the water by the user.

So far as concerns the improvement of the quality of the glue by the addition of the arsenate, it is immaterial to my invention whether the casein used is produced by the old methods employing mineral acids or by my improved process employing the vegetable coagulants.

What I claim as new, and desire to secure by Letters Patent, is as follows:

1. The herein-described process of making casein glue which consists in adding to the casein an alkali arsenate.

2. The herein-described process of making casein glue, which consists in producing casein from milk by the addition of a vegetable coagulant containing tannic acid, and adding to the casein so produced an alkali arsenate.

3. The herein-described process of making casein glue, which consists in adding to the casein an alkali arsenate in the presence of water.

4. The composition of matter for the production of casein glue, consisting of casein and an alkali arsenate substantially as described.

5. The composition of matter for the production of casein glue consisting of casein and potassium arsenate.

In testimony of which invention I have hereunto set my hand.

CHAS. H. BELLAMY.

Witnesses:
J. W. KENWORTHY,
B. M. KELLY.